March 31, 1964

R. H. BOLSTER 3,126,752

TRANSMISSION

Filed Dec. 29, 1960

INVENTOR.
RONALD H. BOLSTER

BY Kenneth C. Witt

ATTORNEY

March 31, 1964 R. H. BOLSTER 3,126,752
TRANSMISSION

Filed Dec. 29, 1960 11 Sheets-Sheet 2

INVENTOR.
RONALD H. BOLSTER
BY
*Kenneth C. Witt*
ATTORNEY

March 31, 1964  R. H. BOLSTER  3,126,752
TRANSMISSION
Filed Dec. 29, 1960  11 Sheets-Sheet 3

INVENTOR.
RONALD H. BOLSTER
BY
Kenneth C. Witt
ATTORNEY

INVENTOR.
RONALD H. BOLSTER
BY Kenneth C. Witt
ATTORNEY

March 31, 1964  R. H. BOLSTER  3,126,752
TRANSMISSION
Filed Dec. 29, 1960  11 Sheets-Sheet 8

INVENTOR.
RONALD H. BOLSTER
BY Kenneth C. Witt
ATTORNEY

March 31, 1964     R. H. BOLSTER     3,126,752
TRANSMISSION

Filed Dec. 29, 1960     11 Sheets-Sheet 10

INVENTOR.
RONALD H. BOLSTER
BY Kenneth C. Witt
ATTORNEY

March 31, 1964 R. H. BOLSTER 3,126,752
TRANSMISSION
Filed Dec. 29, 1960 11 Sheets-Sheet 11

INVENTOR.
RONALD H. BOLSTER
BY
Kenneth C. Witt
ATTORNEY

United States Patent Office

3,126,752
Patented Mar. 31, 1964

3,126,752
TRANSMISSION
Ronald H. Bolster, Jackson, Mich., assignor to Clark Equipment Company, a corporation of Michigan
Filed Dec. 29, 1960, Ser. No. 79,365
20 Claims. (Cl. 74—359)

This invention relates to change speed power transmission mechanisms, and more particularly to such transmission mechanisms having constantly meshing gears plus clutches for selectively clutching such gears to rotatable shafts to provide the desired gear ratio between the input and output shafts of the transmission.

The present transmission is power-shifted and is intended primarily for use in the propulsion of heavy duty automotive vehicles, but it will be apparent that it is not limited to such use and may be adapted for the transmission of power in other applications.

Other constant mesh transmissions are known and have been used heretofore. However, all such prior constant mesh transmissions of which I am aware have had some or all of the deficiencies which are discussed hereinafter.

It is inherent in constant mesh transmissions that when one gear train in such a transmission is in operation to provide a drive through the transmission that one or more other gear trains which are still in mesh and running idle may cause some gears, shafts and clutch parts to operate at speeds far in excess of their normal speeds, that is, the speeds at which they operate when they are in drive transmitting operation. Such operation tends to produce noise which, of course, is undesirable. In addition, it produces undesirable wear on the moving parts. It also tends to reduce efficiency because of the friction of relatively moving parts and also because of the agitation of the oil or other lubricant in which the parts of the transmission ordinarily operate. The problem of parts spinning idly in the manner described is increased when such parts are of large mass, and it is desirable that all such parts which must spin idly under certain conditions have as small a mass as possible.

A further problem encountered in power-shifted constant mesh transmissions is that of accelerating or decelerating parts of large mass when a shift is made by disengaging one or more clutches and engaging one or more other clutches. It will be readily appreciated that the larger the mass of gears, shafts and clutch parts which must be accelerated or decelerated under such conditions, the greater is the wear and strain imposed upon the clutch or clutches which are being engaged to accomplish the ratio change because such clutches during engagement must, by their frictional force, accelerate or decelerate such parts to the same speed as the other parts to which they are being clutched.

Another deficiency frequently encountered in power-shifted constant mesh transmissions is that of having to engage two or more clutches simultaneously in order to accomplish a change in ratios. Such operation is undesirable because it increases the amount of pressurized fluid which must be supplied to fill and engage such clutches as compared to the amount which would be required if only one clutch were engaged at a time. Moreover, unless the engagement of the two clutches is accurately timed so that they engage simultaneously, the pratical result in many situations is that one clutch, the last to engage, actually performs the accelerating or decelerating of parts for both clutches, thus subjecting it to abnormal strain and wear.

The object of the present invention is to provide a power-shifted constant mesh transmission which minimizes the disadvantageous features discussed hereinbefore, that is, one which minimizes the "spinning speeds" of all idle parts, which produces that those parts which must operate at higher than normal speed under certain conditions are the parts of low mass, and which provides that only one clutch need be disengaged and one other clutch engaged in order to change ratios.

A further object of the invention is to provide a transmission which utilizes a minimum of different parts and which also provides for the use of as many parts as possible of one size transmission in other size transmissions of the same "family" of transmissions.

A feature of this invention is that none of the clutch drums, which usually are the rotating parts of greatest mass, operates at greater than engine or input speed under any normal operating condition. All elements which spin at higher than input speed are shafts and gears which have lower mass.

A further feature of this transmission is that during operation, for any ratio change which it is desired to make, the clutch drum in every case is already turning at the speed at which it should operate after the shift is made, therefore, a minimum of time and stress and strain is required to engage such clutch even though, as explained in detail hereinafter, there may be a momentary change in speed of the clutch drum during clutch engaging operation.

Another feature of this transmission is that it provides optional locations for both the input shaft and the output shaft.

Further objects, features and advantages of this invention will be apparent from the subsequent detailed description of preferred embodiments thereof taken in conjunction with the accompanying drawing.

In carrying out my invention in one preferred form, I provide a multiratio constant mesh transmission having a plurality of rotatable shafts arranged in parallel relation in a casing. Included among the shafts are an input shaft, an output shaft and a pair of intermediate shafts. Four multiple disc clutches are located respectively at the ends of the two intermediate shafts. Each of the clutches includes friction discs mounted on its respective shaft end for rotation therewith and a rotatable drum surrounding the shaft end and carrying discs interleaved with the shaft discs, and provision for compressing the respective disc assemblies to selectively engage the clutches. The output shaft has a pair of gears secured thereto. A third gear is secured to one of the intermediate shafts in constant mesh with one of the gears on the output shaft, and a fourth gear is secured to the other intermediate shaft in constant mesh with the other gear on the output shaft. Selective engagement of the clutches produces any desired one of four gear ratios between the input shaft and the output shaft. Additional means may be provided for changing the direction of rotation of the output shaft relative to the input shaft.

For a clearer and more complete understanding of my invention, reference should be had to the following description and the accompanying drawing in which:

FIGURE 1 is a perspective view of the outside of a transmission embodying the present invention;

Figure 4:
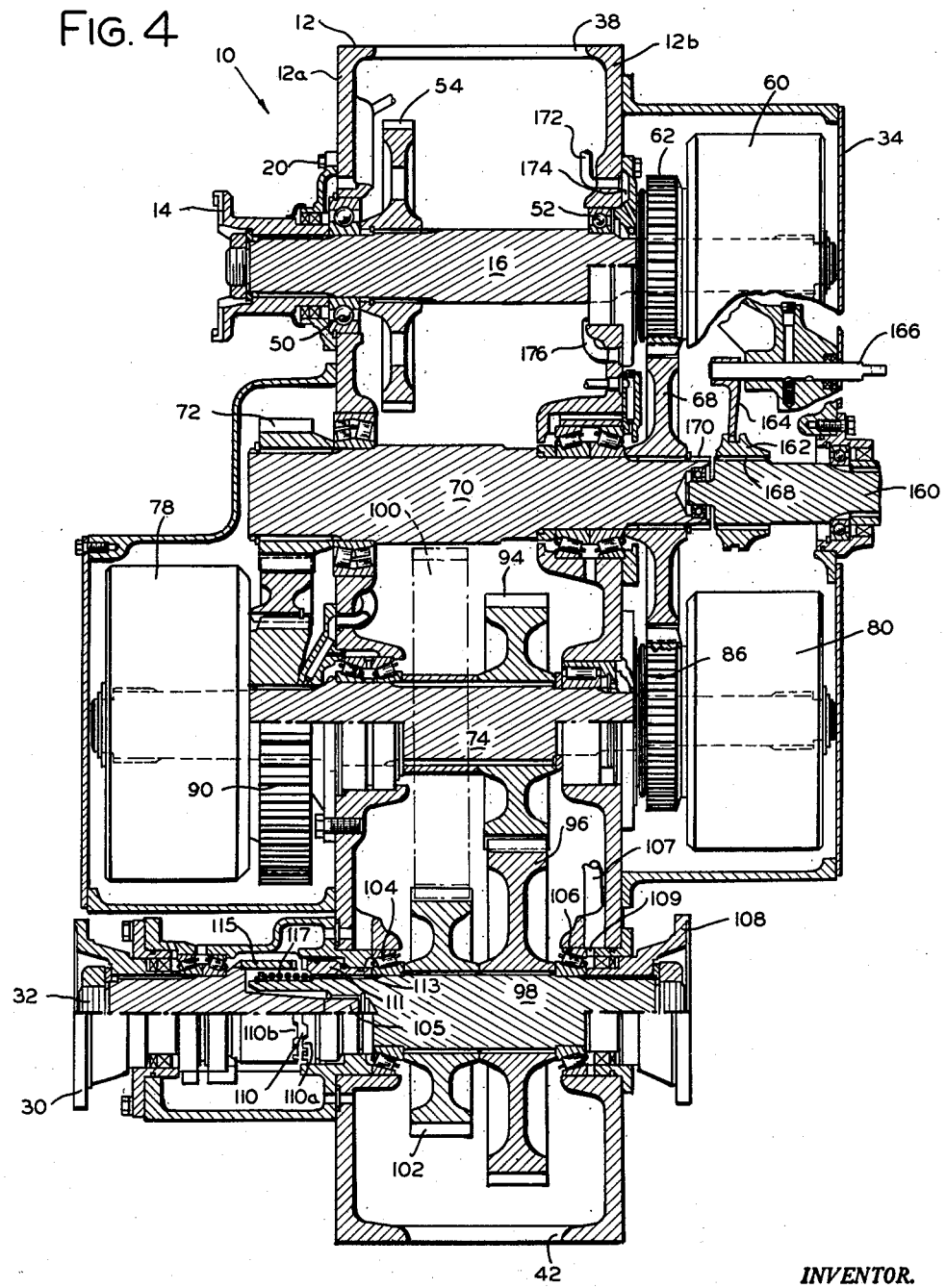
FIGURE 4 is a side elevational view in section along the line 4—4 of FIG. 3.

Referring to the drawing, I have indicated generally by the numeral 10 a transmission embodying the present invention. The numeral 12 identifies the main casing or structural portion of the transmission which houses or provides support for the shafts, gears, clutches and other parts; and as seen in FIG. 4 the principal front and rear walls of the casing are identified by the characters 12a and 12b respectively. The numeral 14 on the drawing indicates a portion of a coupling device which is mounted at the forward end of input shaft 16. A bearing cap 18 surrounds the input shaft outside the front wall 12a of the casing 12, the bearing cap being secured to the wall 12a in a suitable manner such as by a plurality of machine screws 20.

Also on the front wall of casing 12, as seen in FIG. 1, is a combined bearing cap and cover 22, secured to the casing 12 by means such as machine screws 24, which secures and covers the front end of a reverse shaft which is described in more detail hereinafter. On the front wall 12a of the casing 12 too and secured thereto by machine screws 26 or other suitable means is a clutch cover or housing 28 which houses two clutches and three gears which are described hereinafter.

Also appearing on the front of casing 12 is a portion 30 of a coupling device which may be utilized to couple an optional output shaft 32 (see FIG. 4) to a propeller shaft for operating the front wheels of a vehicle. It will be appreciated that member 30 is connected to a similar coupling device portion on the end of a propeller shaft leading to the vehicle front wheels or other instrumentality to be driven by optional output shaft 32. The clutch structure by which shaft 32 may be driven at the operator's option is described in more detail hereinafter.

Figure 3:
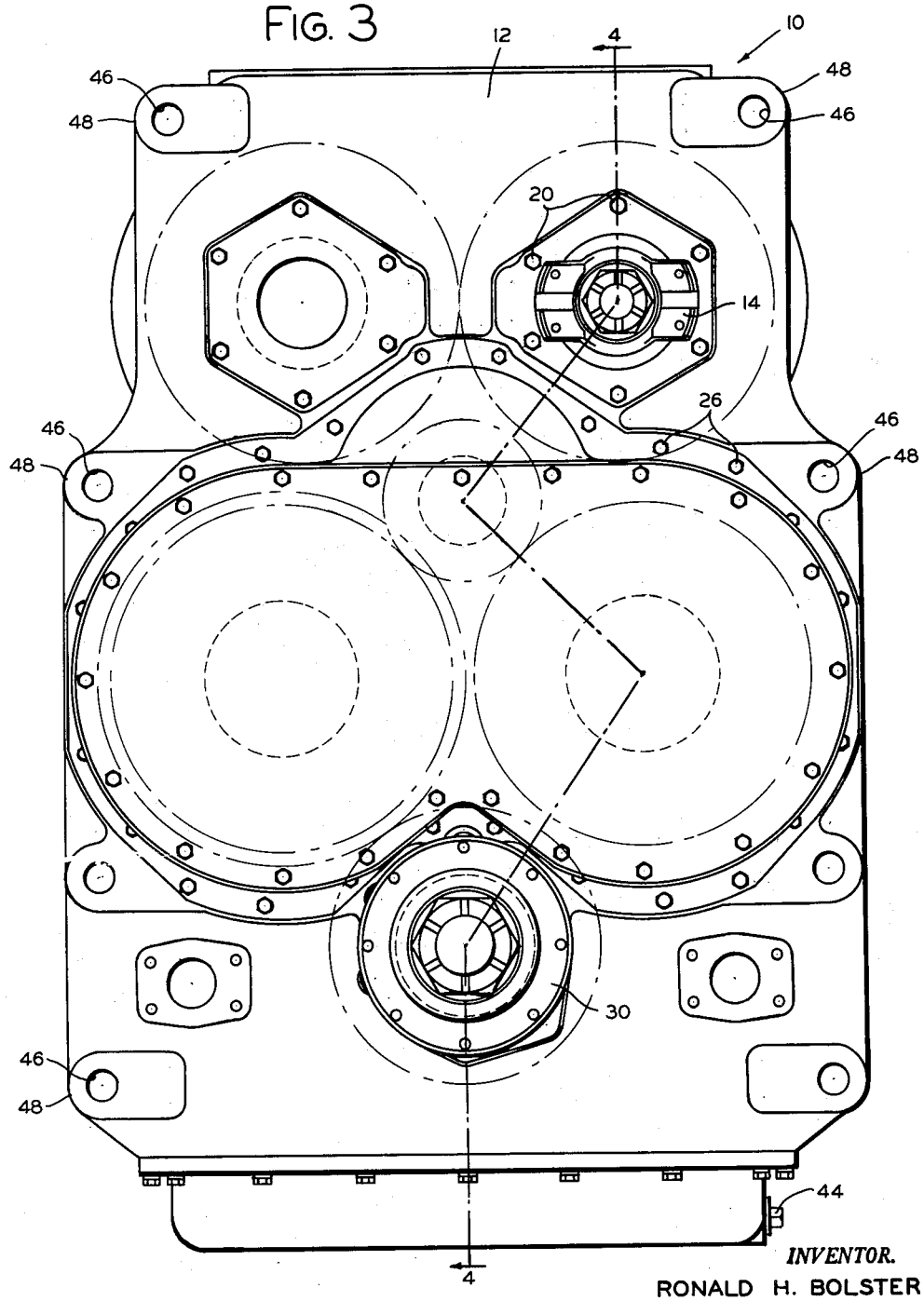
FIGURE 3 is a front end elevational view of the transmission of FIG. 1.

On the rear surface of wall 12b of casing 12 is secured a clutch cover or housing 34 which houses four clutches and associated gears which are described in detail hereinafter. As shown in FIG. 1, the casing 12 is provided with a cover member 36 for opening 38 (see FIG. 4) in the top, while at the bottom of casing 12 a pan or sump member 40 is provided which covers the bottom opening 42 (see FIG. 4) in the casing 12 and provides a reservoir for the liquid utilized in the transmission for lubrication and cooling and for actuating the clutches. Parts 36 and 40 have been omitted from FIG. 4 to conserve space. The reservoir may be drained by removing plug 44 (see FIGS. 1 and 3). The transmission may be installed by the use of bolts or other securing devices through openings 46 in the bosses 48 on the casing 12.

Figure 2:
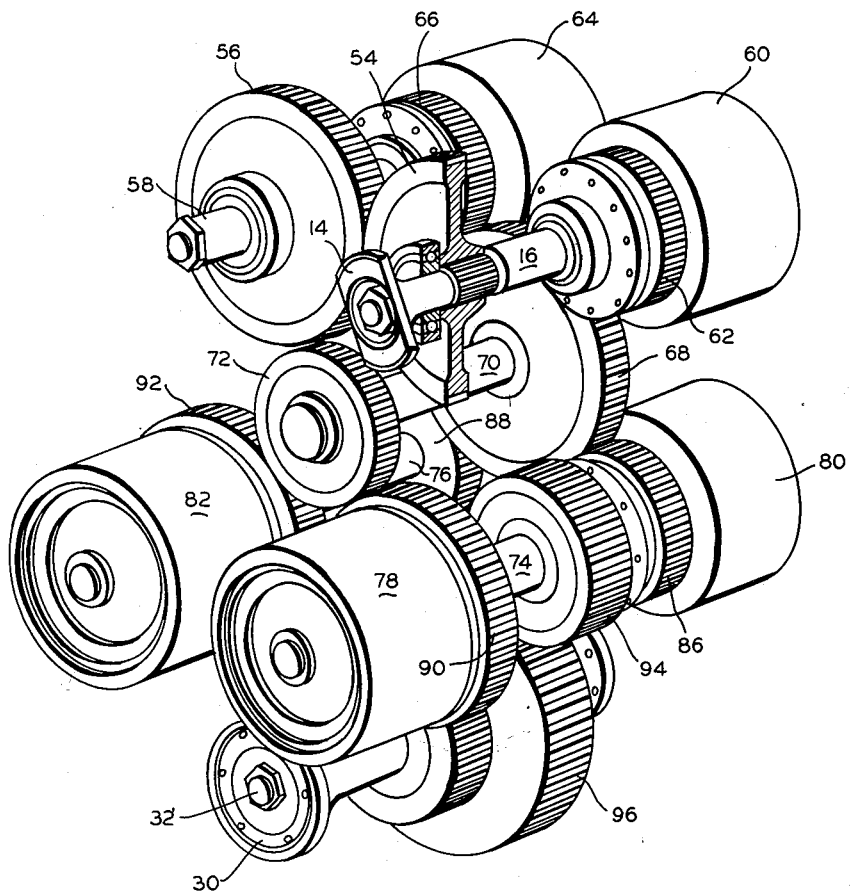
FIGURE 2 is a perspective view from approximately the same point as FIG. 1 but with the housing and casing members removed to show the shafts, gears and clutches.
Figure 5:
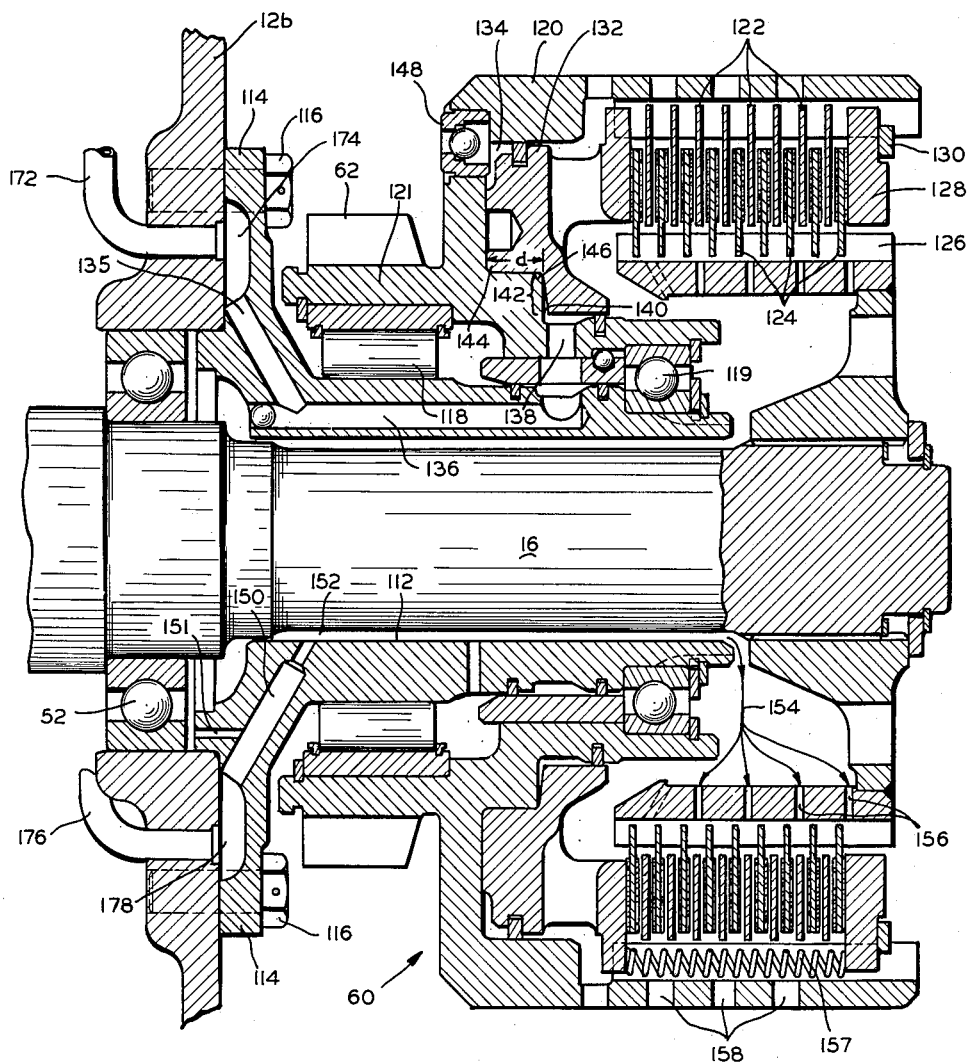
FIGURE 5 is an enlarged view in section of one of the clutches of FIG. 4.

Referring now to FIG. 4 and also to FIG. 2 which depicts more clearly the gear arrangement, it will be observed that the input shaft 16 is journaled by means of a ball bearing assembly 50 in the front wall 12a of casing 12 and by means of another ball bearing assembly 52 in the rear wall 12b of the casing 12. Shaft 16 carries a gear 54 splined or otherwise secured thereto which meshes with a gear 56 (see FIG. 2) which is secured to and rotates reverse shaft 58. A clutch 60 located outside the rear wall 12b of the casing may be selectively actuated to connect a gear 62 for rotation with the input shaft 16, while a clutch 64 may be selectively actuated to connect a gear 66 for rotation with the reverse shaft 58. The detailed construction of clutches 60 and 64 is shown in FIG. 5 which is described in detail hereinafter.

Both gears 62 and 66 are constantly in mesh with a gear 68, located rearwardly of wall 12b, which is secured to and rotates an idler shaft 70. The shaft 70 also has another gear 72 secured at the front end thereof, in front of casing wall 12a, which rotates when gear 68 and shaft 70 rotate.

Figure 6:
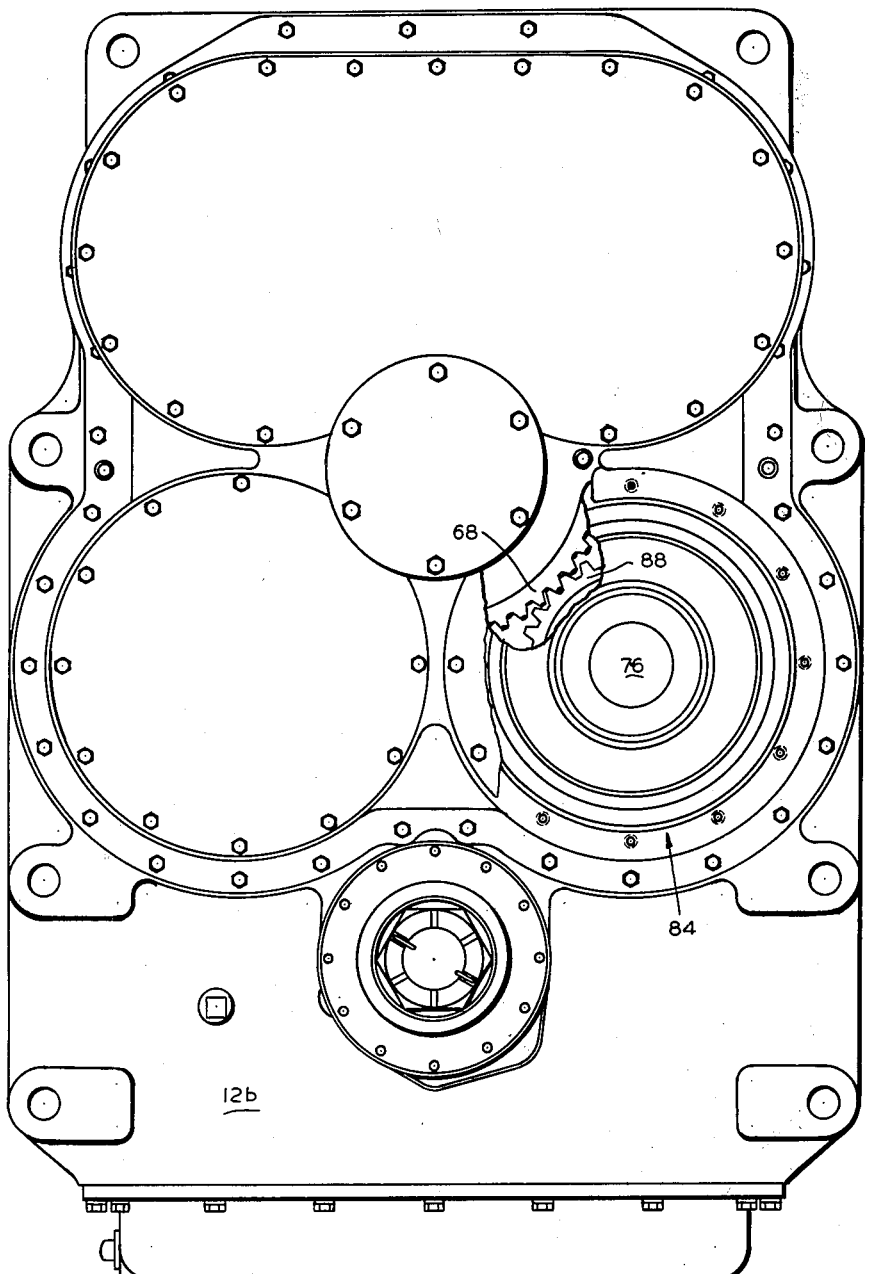
FIGURE 6 is a rear elevational view of the transmission of FIGS. 1–5 with portions of the housing and casing broken away to show certain parts which are not visible in the preceding figures.

Two so-called intermediate shafts are provided and these are indicated by the numerals 74 and 76. Each of these shafts has clutches at both ends, the clutch at the front end of shaft 74 being designated by the numeral 78 while the clutch at the rearward end of this shaft is designated 80. Shaft 76 has clutch 82 at the front end and at the other end another clutch indicated by numeral 84 which is visible in FIG. 6. The gear 68 on the idler shaft 70 is in constant mesh with gear 86 which may be selectively connected by clutch 80 to shaft 74, and also with a gear 88 which may be selectively connected by clutch 84 (see FIG. 6) to shaft 76. Similarly at the front of the transmission, gear 72, on the idler shaft, is in constant mesh with a gear 90 which may be selectively connected by clutch 78 to shaft 74, while a gear 92, also in constant mesh with gear 72, may be selectively connected by clutch 82 to shaft 76.

Mounted on the shaft 74 for rotation therewith is a gear 94. Gear 94 is in constant mesh with a gear 96 which is secured to output shaft 98. Gear 100 is mounted on shaft 76 and is in constant mesh with gear 102 which likewise is mounted on output shaft 98. Output shaft 98 is journaled in the front and rear walls 12a and 12b of the casing member 12 by means of anti-friction bearings which are illustrated as tapered roller bearing assemblies 104 and 106. A portion 108 of a coupling device is mounted on the rearward end of shaft 98, providing for coupling the output shaft to a propeller shaft for operating the rear wheels of a vehicle or other device to be operated by the transmission. As may be seen in FIG. 4, the portion 105 of the reduced diameter rearward end of shaft 32 is journaled in a mating recess in the forward end of shaft 98, and a tooth clutch mechanism 110 is provided for selectively connecting shaft 32 to shaft 98 when it is desired to provide drive forwardly as well as rearwardly from the transmission. Clutch 110 includes teeth 110a on a collar 111 which is splined at 113 or otherwise secured to shaft 98 in axially movable relation. Arranged to mate with teeth 110a are teeth 110b on a collar member 115 which is secured to shaft 32. The collar 111 is slidable axially to the left by suitable mechanical or power operating mechanism not shown, the collar 111 being returned to the right by a return spring 117 when it is desired to disconnect shaft 32. When this transmission is installed in a vehicle the shaft 32 is connected when it is desired to provide the vehicle with four-wheel drive, but when only two-wheel drive is desired, shaft 32 is disconnected and the sole drive is provided by shaft 98 through the coupling portion 108 at the rearward end thereof.

FIG. 5 illustrates in detail clutch 60. It is pointed out, however, that clutches 64, 80 and 84 are identical with this clutch, while clutches 78 and 82 are the same except as to size. Thus, an explanation of clutch 60 will suffice for all of the clutches.

In FIG. 5 I have indicated by the numeral 112 a fixed annular sleeve or quill member which is connected by means of a flange portion 114 thereon to the rear surface of rear wall 12b of the casing in a suitable manner such as by a plurality of machine screws 116. As shown, gear 62 is formed integrally on an axial projection 121 from a clutch drum which is indicated by the numeral 120. The combined gear and clutch drum structure 62 is journaled on the tubular portion of member 112 by means of an anti-friction bearing shown as a roller bearing 118 and another anti-friction bearing shown as ball bearing 119. The drum 120 carries a plurality of annular friction discs 122 which are splined to the clutch drum for rotation therewith. Interleaved between the friction discs 122 are alternate annular discs 124 which are splined to a hub member 126 which in turn is splined to shaft 16 for rotation therewith.

The clutch structure includes a backing plate or ring 128 which is secured at the outer end of drum 120 in a suitable manner such as by a snap ring 130. The clutch is applied by compressing the stack of discs 122, 124, and this is accomplished by an annular piston member 132. The piston 132 is mounted for axial movement in a chamber 134 which is formed inside drum 120.

The piston is moved by fluid under pressure which is admitted through a slanted passageway 135 in member 112 to a longitudinal passageway 136 from which it passes through suitable sealing means to passageway 138 in the drum member and thence into chamber 134 and behind or to the left of piston 132 at location 140 which initiates movement of the piston to the right. Initial movement on the piston 132 is rapid upon the admission of fluid under pressure because only a small portion of the cross-sectional area of piston 132 is effective initially. This is the area which is indicated in the sectional view of FIG. 5 by the numeral 142 and bracket associated therewith. After piston 132 has moved distance $d$ to the right and the shoulder portion on the piston indicated by the numeral 144 passes the shoulder 146 on the drum member, then the full end area of the piston 132 is exposed to pressurized fluid. This, of course, provides much greater pressure on the piston. The effect of the structure and operation just described is that the piston moves rapidly in the initial stages but with a relatively small force. When it nears the end of its stroke to the right to provide clutch engagement, increased force on the piston insures complete clutch engagement and lack of slippage during operation. When it is desired to disengage the clutch the source of pressurized fluid is disconnected and fluid is released from chamber 134 by means of a step-type ball check valve 148. Piston 132 is then retracted by a plurality of springs 157 extending between the piston and backing ring 128, one of which is visible near the bottom of FIG. 5. As indicated by the drawing, the spline projections on the multiple discs 122 are omitted or cut off at intervals around the periphery of these discs, and retracting springs are inserted, as shown, in the corresponding spline grooves in the drum 120. For more information on valve 148 reference should be had to my Patent 2,954,040 wherein this valve is disclosed in detail and claimed.

For cooling the clutch during the time when it is not engaged and there is relative motion between the alternate friction discs, a passageway 150 is provided through which cooling fluid is supplied under pressure to the annular space 152 between shaft 16 and sleeve member 112 from whence the fluid flows along the path indicated by the line 154 through openings 156 in the hub member 126, thence over the surfaces of the discs 122 and 124 and out through the openings 158 in the hub member 120; after which such fluid drains back to the sump by gravity.

A further feature of this transmission is the so-called power take-off which is illustrated in FIG. 4 of the drawing. This power take-off mechanism comprises a shaft 160 which is arranged to be selectively connected to shaft 70 in order to drive simultaneously an auxiliary device on a vehicle or other device which it is desired to drive in addition to the mechanism driven by the main output shaft 98. Shaft 160 is connected to shaft 70 merely by shifting collar 162 to the left by means of a shifter fork 164 which is operated by a rod 166. It will be observed that collar 162 is splined to shaft 160 at 168. The shaft 70 is provided with suitable splines at 170 and when collar 162 is moved to the left a driving connection is thereby provided between shaft 70 and shaft 160.

While most of the piping has been omitted from the drawing in order to simplify it, it will be appreciated by those skilled in the art that a pump or other source of pressurized fluid is provided which supplies fluid for the operation and cooling of all of the clutches, and also for the pressure lubrication of all bearings as described hereinafter. Such pressurized fluid is regulated as to pressure and controlled by suitable control valves (not shown) in a manner such that it is admitted selectively to the clutches which are to be actuated. In FIG. 4 there appears a fragmentary portion of a conduit or pipe 172 which supplies pressurized fluid to the chamber 174 shown in this figure and in FIG. 5 from whence fluid flows through passageway 135 and thence into clutch actuating chamber in the manner previously described. Conduit or pipe 176, a fragment of which is shown in FIG. 4 also, supplies cooling fluid to clutch 60 through wall 12b of the casing into chamber 178 and thence through passageway 150 and space 152 in the manner previously described to cool the clutch discs. It will be appreciated that all six of the clutches are actuated and cooled in the same manner described for clutch 60.

Each of the anti-friction bearings associated with one of the clutches is continuously lubricated by fluid under pressure and this is illustrated in FIG. 5 of the drawing. A passageway 151 directs pressurized fluid from passageway 150 through bearing 52 continuously. Each of the other friction bearings in the transmission also is continuously pressure lubricated in a similar manner and this is illustrated by conduit 107 a fragment of which is illustrated in FIG. 4. Conduit 107 admits pressurized fluid continuously through an opening 109 and provides for the continuous flow of lubricant through anti-friction bearing 106.

The transmission described and illustrated herein provides for the rotation of output shaft 98 in either direction at any of four different gear ratios. This transmission is intended primarily for use in a vehicle, therefore, the two directions will be referred to in the following description of the operation of the transmission as forward and reverse. To operate the output shaft 98 in a forward direction, clutch 60 is engaged, this clutch being referred to in the following explanation as the forward clutch. The first forward ratio is provided by engaging clutch 78 in addition to clutch 60. The drive can then be traced from input shaft 16 through clutch 60 and gears 62 and 68 to idler shaft 70 and thence through gears 72 and 90 and through clutch 78 to shaft 74 from which gears 94 and 96 drive output shaft 98. This provides the greatest gear reduction of the four ratios. If less gear reduction is desired, clutch 78 is disengaged and clutch 82 is engaged. In this ratio the drive is the same down to the idler shaft from which it may be traced through gears 72 and 92, through clutch 82 to shaft 76, thence through gears 100 and 102 to shaft 98.

If the next lower ratio gear reduction is desired, clutch 82 is disengaged and clutch 80 is engaged. The drive then may be traced from the idler shaft 70 through gears 68 and 86 and clutch 80, thence from shaft 74 through gears 94 and 96 to shaft 98. The highest speed or smallest gear reduction is provided by disengaging clutch 80 and engaging clutch 84 whereupon the drive is from the idler shaft through gears 68 and 88 and through clutch 84, thence through shaft 76 and gears 100 and 102 to shaft 98.

It will be understood from the foregoing explanation that in order to change ratios it is necessary only to disengage one clutch and engage another clutch. It is not necessary for any ratio change simultaneously to disengage two clutches and engage two other clutches. Moreover, the drum of the clutch which is to be engaged or applied is already operating at the desired speed. Consider, for example, the first ratio change mentioned hereinbefore in which clutch 78 is disengaged and clutch 82 is engaged. Gear 92 on the drum of clutch 82 is in constant mesh with gear 72 the same as gear 90 on clutch drum 78. The drum of clutch 82 therefore rotates continuously during the time that clutch 78 is applied. Assuming that the engine speed remains constant during a shift, then clutch drum 82 will be operating at the same speed after the shift as before, although it will be understood that if such a shift is made under load, that is, without temporarily removing the load connected to the output shaft, that there will be a momentary reduction in the speed of the drum of clutch 82 during engagement of this clutch as the shaft 76, gears 100 and 102, and the output shaft 98 and the load connected thereto are accelerated to speeds corresponding to the speed of the drum of clutch 82. The operation of this transmission is similar in this respect for all ratio changes whether shifting up or shifting down.

To provide reverse drive clutch 60 is disengaged and clutch 64 is engaged whereupon the drive may be traced from the input shaft 16 through gears 54 and 56 to reverse shaft 58, and thence through clutch 64 and gears 66 and 68 to idler shaft 70 which then rotates in the opposite direction to that previously described when clutch 60 was engaged. It will be understood that each of the four ratios previously described for forward operation may be obtained for reverse operation and may be traced in the same manner from idler shaft 70. The only difference is that idler shaft 70 now is turning in the opposite direction so that the output shaft 98 likewise turns in the opposite direction. As illustrated gears 54 and 56 are identical as are gears 62 and 66, therefore the total gear reduction is exactly the same for both directions of operation.

To provide a concrete example of one transmission design which has been constructed in accordance with this invention and to assist in pointing up some of the advantages of the invention, I am listing below each of the gears of the design shown in FIGS. 1–7 inclusive and the number of teeth employed for each gear in a transmission having a nominal input torque rating of 800 ft. lbs.

| Gear: | Number of teeth |
|---|---|
| 54 | 47 |
| 56 | 47 |
| 62 | 28 |
| 66 | 28 |
| 68 | 47 |
| 72 | 23 |
| 86 | 28 |
| 88 | 28 |
| 90 | 52 |
| 92 | 52 |
| 94 | 40 |
| 96 | 56 |
| 100 | 56 |
| 102 | 40 |

The foregoing combination of gears provides the following gear reductions in each of the four ratios:

Ratio I $\quad \frac{47}{28} \times \frac{52}{23} \times \frac{56}{40} = 5.31$

Ratio II $\quad \frac{47}{28} \times \frac{52}{23} \times \frac{40}{56} = 2.71$

Ratio III $\quad \frac{47}{28} \times \frac{28}{47} \times \frac{56}{40} = 1.396$ Ratio IV $\quad \frac{47}{28} \times \frac{28}{47} \times \frac{40}{56} = .717$ From the foregoing description it will be appreciated that this invention provides for the multiple use of a great many parts, thus minimizing the number of different parts it is necessary to manufacture in order to assemble the transmission. For example, input shaft 16 and reverse shaft 58 and the gears, clutches and bearings associated therewith are identical. Thus, instead of being required to manufacture two different assemblies for the forward and reverse shafts, it is possible to manufacture two of a single assembly.

It has been pointed out previously that clutch assemblies 60, 64, 80 and 84 all are identical and that clutch assemblies 78 and 82 are identical to each other. Moreover, shafts 74 and 76 are identical, and gear 94 is identical gear 102 while gear 96 is identical to gear 100. Thus, in manufacturing the two intermediate shaft assemblies it is likewise possible to manufacture two complete sets of parts which are identical instead of manufactuirng two completely dissimilar sets of parts. To achieve the desired gear ratios two of the final drive gears, that is, gears 100 and 102 are reversed during assembly so that the gear 102 with the smaller number of teeth is on the output shaft.

Another advantage of this invention is that it is possible to utilize parts from the transmission described and illustrated herein in other transmissions of the same design but of different sizes. For example, clutches identical to clutches 60, 64, 80 and 88 are used in place of clutches 78 and 82 in a transmission of half the nominal capacity, that is, 400 ft. lbs. Similarly clutches identical to 78 and 82 are used as clutches 60, 64, 80 and 88 in another transmission which is double the size or 1600 ft. lbs. It will be appreciated by those familiar with the manufacturing and maintenance of transmissions that the use of a single part or assembly in several places in a single transmission and in other places in other size transmissions in the same family is very beneficial in reducing manufacturing costs because it makes possible the production of a greater volume of fewer different items. It also aids greatly in the maintenance and servicing of transmissions because it makes it necessary to keep in stock for maintenance purposes fewer different parts, thus reducing the cost of stocked parts and the space required to store them.

Another advantage of this invention is that it is possible readily to adjust gear ratios without changing the basic construction of the transmission. For example, it is possible to change the number of teeth on gears 94 and 96 without changing any other parts of the transmission and thereby achieve a change in the gear reductions of the first and third ratios. Gears 100 and 102 may be changed similarly, as may also other gear combinations such as 72, 90 and 92.

A feature of this invention is that it is possible readily to change the location of the input shaft without changing any of the internal parts of the transmission. Inasmuch as the reverse shaft 58 and the clutches and gears thereon are identical with forward shaft 16 and the clutches and gears thereon, as pointed out previously, it will be apparent that it is possible to use shaft 58 as the input shaft if desired with no change except to move coupling portion 14 from shaft 16 to shaft 58. If it is possible to have the driving shaft which operates shaft 58 turn in the opposite direction no further change is necessary. If it is not possible to change the direction of rotation of the driving shaft it is necessary only to change or relabel the control valve because as far as the transmission itself is concerned, it provides exactly the same ratios for both directions of operation.

Figure 8:
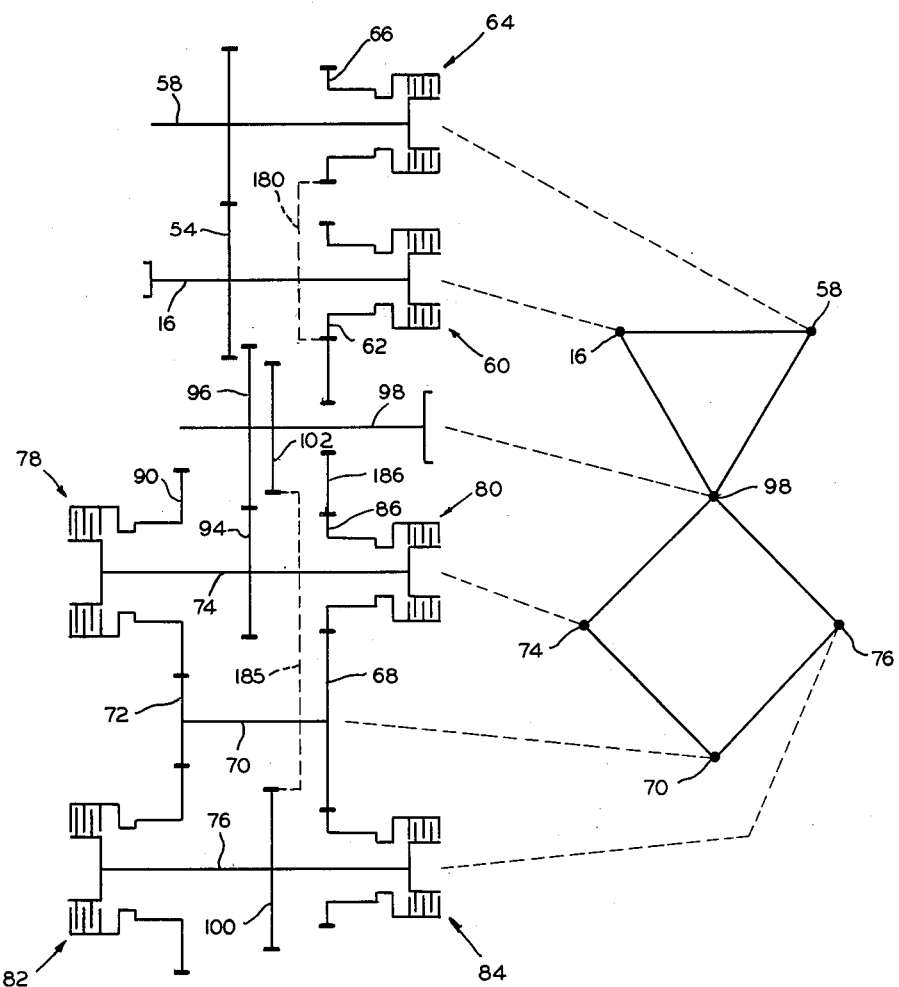
FIGURE 8 is a schematic and diagrammatic figure similar to FIG. 7 except showing another embodiment of the transmission in which the output shaft is at a different location.
Figure 9:
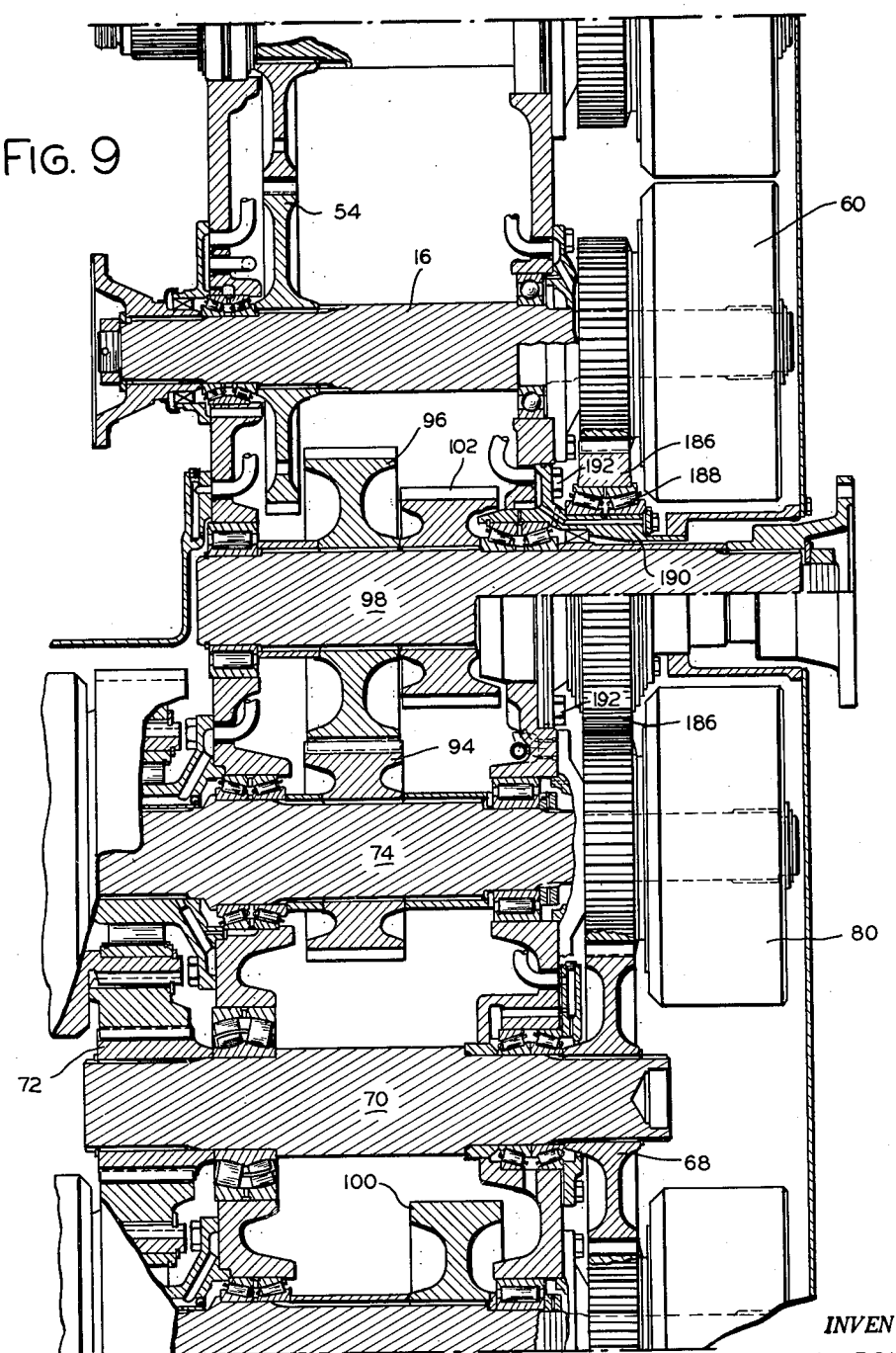
FIGURE 9 is a developed view showing constructional details of the lower portion of the transmission of FIG. 8.
Figure 10:
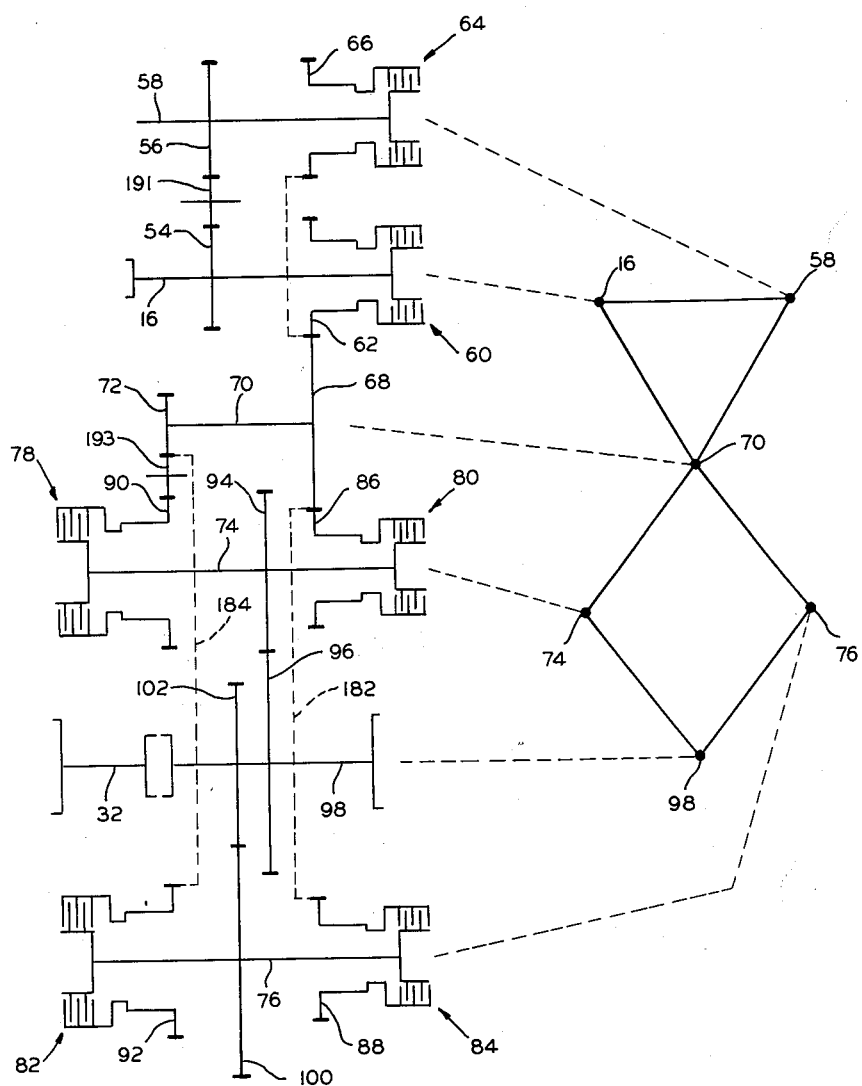
FIGURE 10 is a schematic and diagrammatic view similar to FIGS. 7 and 8 of a third embodiment of the invention.

It is possible also with this invention to secure other variations with a minimum of alteration in the transmission construction and two such variations are illustrated and described herein. FIGS. 8 and 9 show a different embodiment of the invention in which the output shaft is in the location of the idler shaft of the first embodiment, while FIG. 10 shows a variation which provides six forward ratios and two reverse ratios.

Figure 7:
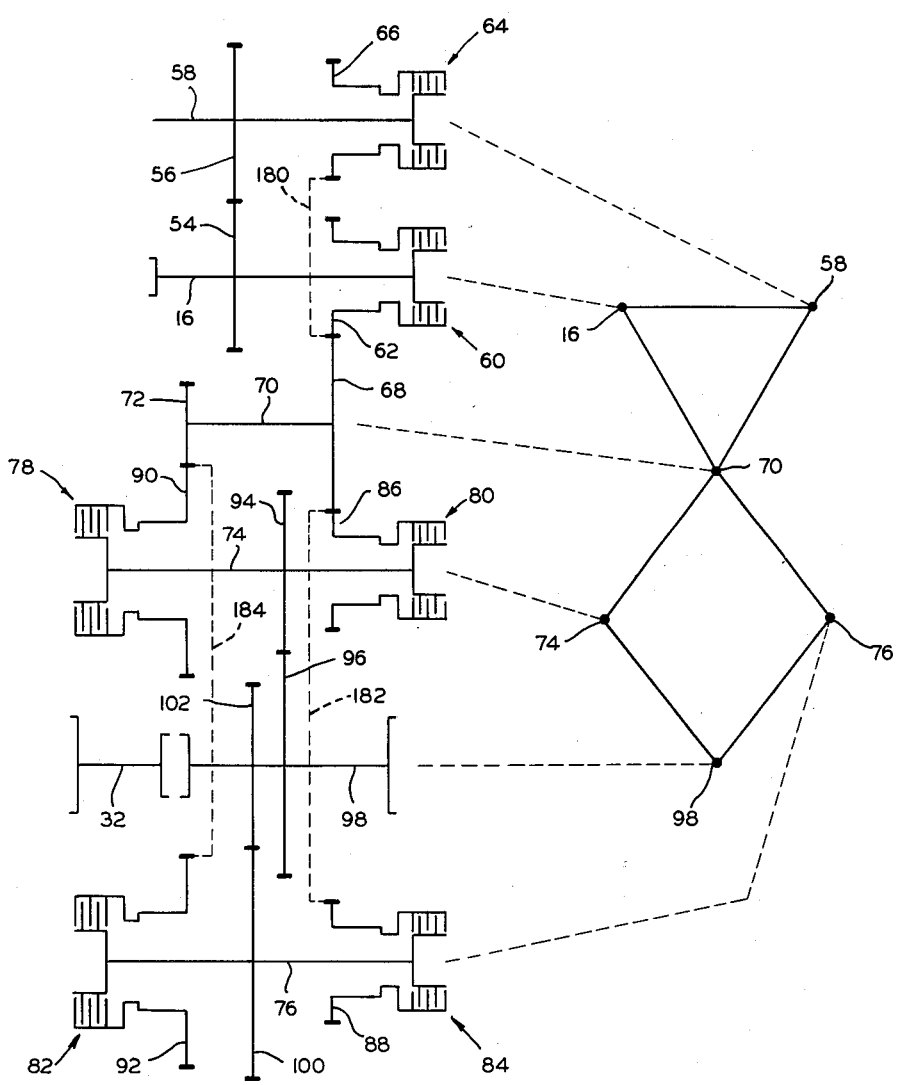
FIGURE 7 is a two-part diagrammatic representation of the transmission of FIGS. 1 through 6, having a developed schematic diagram on the left in which the gears, shafts and clutches are shown with the shaft centers in one plane and on the right a diagram which shows the actual positions, as viewed from the end, of the centers of the shafts.

Reference is made first to FIG. 7 of the drawing for an explanation thereof, to facilitate an understanding of the remaining figures of the drawing and the other embodiments illustrated thereby. FIG. 7 shows at the left a developed schematic diagram of the transmission of the first embodiment (FIGS. 1-6 inclusive) in which all shaft centers are shown in a single plane. Each of the shafts and gears and clutches is numbered to correspond with the preceding figures, and it is indicated by the dashed line 180 that gear 66 is in mesh with gear 68. In a similar manner it is indicated by dashed line 182 that gear 88 is in mesh with gear 68 and by line 184 that gear 92 is in mesh with gear 72. To the right of FIG. 7 is shown a diagram of the actual location of the centers of the various shafts (viewed from the rear) and each of these is connected by a dashed line to the respective shafts in the left portion of FIG. 7.

FIG. 8 is similar to FIG. 7 and illustrates how with a slight alteration it is possible to have the output shaft in the location occupied by the idler shaft in the first embodiment and vice versa, that is, with the idler shaft in the location occupied by the output shaft in the first embodiment. To accomplish this, it is necessary to utilize an annular transfer gear 186 which is interposed between forward gear 62 and reverse gear 66 and gear 86. As shown in FIG. 9 which is a side elevation in section similar to FIG. 4 of the first embodiment except that it is a developed view with all the shaft center lines shown in a single plane, the gear 186 is carried by an antifriction bearing shown as a double tapered roller bearing 188 on a fixed annular sleeve or quill 190 which is secured to the rear surface of the wall 12b in a suitable manner such as by a plurality of machine screws 192. Thus gear 186 rotates around the output shaft 98 in this embodiment. Corresponding parts are provided with the same identifying characters in FIGS. 8 and 9 as in the preceding figures for the earlier embodiment.

In the second embodiment of FIGS. 8 and 9, the input shaft 16 and the reverse shaft 58 and the gears and clutches associated therewith operate in the same manner as in the first embodiment. Gears 62 and 66 both are in mesh with transfer gear 186, and the dashed line 180 in FIG. 8 indicates the meshing of gear 66 and gear 186. Transfer gear 186 drives idler gear 68 and idler shaft 70 through gear 86. Thus when clutch 80 is engaged to provide one drive ratio through shaft 74 and gears 94, 96 to output shaft 98 and the other three ratio clutches are disengaged, the idler shaft 70 does not transmit any torque although it does continue in operation. In the other three ratios the drive is through the idler shaft and the respective clutches 78, 82 and 84 and thence through the respective gears 90, 92 and 88 associated with these clutches and through the respective intermediate shafts, through gears 94, 96 or gears 100, 102 to the output shaft 98. The dashed line 185 in FIG. 8 shows that gear 100 is in mesh with gear 102.

FIG. 10 of the drawing shows a third embodiment of the invention which is similar to the first embodiment except that by the introduction of a small idler gear between gears 54 and 56 respectively and another idler gear between gears 72 and 90 it is possible to provide as illustrated in FIG. 10 a transmission having six forward ratios and two reverse ratios. In order not to change the center distance between shafts 16 and 58, the two gears 54 and 56 on these shafts are made smaller and an idler gear 191 is inserted between these two gears. This means that shaft 58 will then operate in the same direction as shaft 16 instead of the opposite direction as in previous embodiments, and the gear ratio is chosen such that the speed of shaft 58 is a desired amount faster or slower than shaft 16. Thus it is possible by actuating selectively clutches 60 and 64 to operate idler shaft 70 at either of two speeds in the forward direction. If no further alteration were made, the transmission then would provide a total of eight forward ratios inasmuch as any one of the ratio clutches 78, 80, 82 and 84 could be utilized with either one of the clutches 60 and 64. However, in order to provide for reverse operation idler 193 may be inserted between gears 72 and 90 as illustrated in FIG. 10, the diameter of gear 90 being reduced to accommodate the idler without changing shaft centers in the transmission. This reverses the direction of shaft 74 and output shaft 98 when clutch 78 is applied simultaneously with either clutch 60 or 64. Thus there is provided a transmission with six forward and two reverse ratios.

Figure 11:
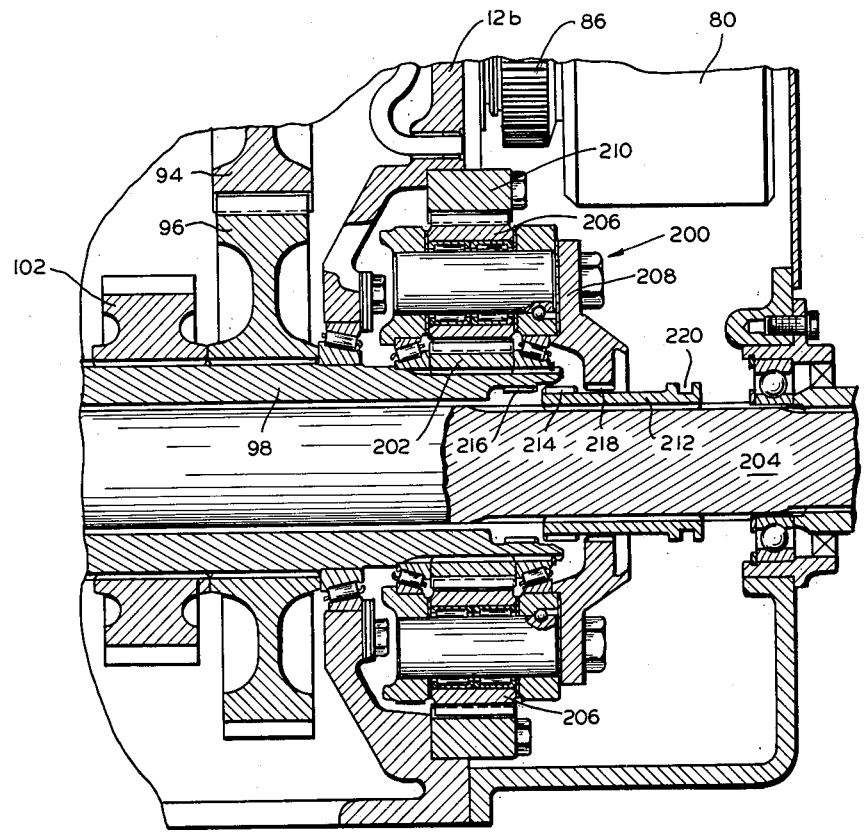
FIGURE 11 shows a feature which may be utilized in connection with the invention.

To demonstrate further the versatility of this invention there is shown in FIG. 11 a two-ratio planetary gear mechanism which may be added readily to the form of the invention illustrated in FIGS. 1-7 to provide for eight ratios both forward and reverse. It should be understood that while only a portion of the complete transmission is illustrated in FIG. 11, the remainder of the transmission is the same as the first embodiment which is shown in side elevation in FIG. 4. The parts which appear in FIG. 11 that are the same as those in FIG. 4 bear the same reference numerals.

In FIG. 11 the additional two-ratio planetary mechanism is indicated generally by the numeral 200 and it includes a sun gear 202 which is splined to output shaft 98 which in this case is bored out to provide for an additional shaft 204 within shaft 98. Sun gear 202 is in mesh with a plurality of planet gears 206, two of which are visible in FIG. 11, which are journaled on a planet carrier 208. The planet gears 206 also are in mesh with a ring gear 210 which is secured to the rear casing wall 12b. A shift sleeve 212 is provided having outwardly projecting teeth 214 thereon which are adapted to mesh either with inwardly projecting teeth 216 on output shaft 98 or with inwardly projecting teeth 218 on the planet carrier 208. Sleeve 212 is shifted by means of a collar having a groove 220 into which a known shifting fork engages. When sleeve 212 is shifted to the left from the neutral position shown, so that teeth 214 and 216 are in mesh, the shaft 204 is coupled directly to shaft 98, and it will be appreciated that this provides one set of four ratios in both forward and reverse in the same manner as described previously for the first embodiment of the invention. When sleeve 212 is shifted to the right so that teeth 214 thereon mesh with teeth 218 on the planet carrier another gear reduction is introduced through the planetary mechanism 200, the ring gear 210 serving as the reaction member with the planet carrier 208 being driven at a slower speed than sun gear 202. This operates shaft 204 at a slower speed and thus provides another set of four forward and reverse ratios for the transmission, making a total of eight ratios in each direction altogether.

While I have described and illustrated herein three preferred embodiments of my invention, it will be apparent to those skilled in the art that other embodiments and modifications of the invention may be made. It should be understood, therefore, that I intend to cover by the appended claims all modifications which fall within the true spirit and scope of my invention.

I claim:

1. A multi-ratio transmission comprising, a plurality of rotatable shafts arranged in parallel relation including an input shaft, an output shaft and a pair of intermediate shafts, means for driving the said intermediate shafts selectively from the said input shaft comprising four clutches located respectively at the ends of intermediate shafts, each of the said clutches including at least one friction member mounted on the respective shaft end for rotation therewith and a rotatable drum surrounding the shaft end and arranged to be selectively clutched to its respective friction member, the said rotatable drums being selectively connectable in driving relation with the said input shaft, first and second gears secured to the said output shaft for the rotation thereof, a third gear secured to one of the said intermediate shafts and in constant mesh with said first gear, and a fourth gear secured to the other said intermediate shaft and in constant mesh with the said second gear.

2. A transmission comprising a plurality of rotatable shafts arranged in parallel relation including an input shaft, an output shaft and a pair of intermediate shafts, means for driving the said intermediate shafts selectively from the said input shaft including a plurality of gears and four clutches associated two each with the said intermediate shafts, first and second output gears secured to the said output shaft for the rotation thereof, a third gear secured to one of the said intermediate shafts and in constant mesh with the said first output gear, and a fourth gear secured to the other said intermediate shaft and in constant mesh with the said second output gear.

3. A multi-ratio transmission comprising, a plurality of rotatable shafts arranged in parallel relation including an input shaft, an output shaft and a pair of intermediate shafts, four clutches located respectively at the ends of the said intermediate shafts, each of the said clutches including at least one friction member mounted on the respective shaft for rotation therewith and a rotatable drum surrounding the shaft end and arranged to be selectively clutched to its respective friction member, selective means for driving any of the said four clutch drums in either direction of rotation from the said input shaft, first and second gears secured to the said output shaft for the rotation thereof, a third gear secured to one of the said intermediate shafts and in constant mesh with said first gear, and a fourth gear secured to the other said intermediate shaft and in constant mesh with the said second gear.

4. A multi-ratio transmission comprising, a plurality of rotatable shafts arranged in parallel relation including an input shaft, an output shaft and a pair of intermediate shafts, means for driving the said intermediate shafts selectively from the said input shaft comprising four clutches located respectively at the ends of the intermediate shafts, each of the said clutches including at least one friction member mounted on the respective shaft for rotation therewith and a rotatable drum surrounding the shaft end and arranged to be selectively clutched to its respective friction member, four gears connected respectively to and arranged to drive the said clutch drums, means including a reverse shaft, additional clutches and four additional gears in constant mesh respectively with the said clutch drum gears for selectively rotating any one of the said clutch drums in either direction, first and second output gears secured to the said output shaft for the rotation thereof, a first intermediate shaft gear secured to one of the said intermediate shafts and in constant mesh with a first one of the said output gears, and a second intermediate shaft gear is secured to the other intermediate shaft and in constant mesh with the second said out put gear.

5. A multi-ratio change speed transmission providing four drive ratios in each direction and comprising, six rotatable shafts arranged in parallel relation including an input shaft, a reverse shaft, an idler shaft, a pair of intermediate shafts and an output shaft, a first clutch located at one end of the said input shaft, a second clutch located at one end of the said reverse shaft, four ratio clutches located respectively at the ends of the said two intermediate shafts, each of the said six clutches including a plurality of friction disc members mounted on the respective shaft end for rotation therewith, a rotatable drum surrounding the respective shaft end and carrying a plurality of friction discs interleaved with the said friction discs on the shaft and means for compressing the disc assembly of each clutch for clutching the drum to its respective shaft end, each of the said clutch drums having a drum gear connected thereto for rotation therewith, constant mesh gear means for driving the said reverse shaft from the said input shaft, a first idler gear secured to the idler shaft and in constant mesh with the said forward and reverse drum gears and also in constant mesh with the drum gears of two of the said ratio clutches, a second idler gear secured to the idler shaft and in constant mesh with the drum gears of the other two ratio clutches, a first intermediate shaft gear secured to one of the said intermediate shafts, a second intermediate shaft gear secured to the other intermediate shaft, and a pair of output gears secured to the said output shaft for the rotation thereof and in constant mesh respectively with the said first and second intermediate shaft gears.

6. A power transmission including an input shaft, an output shaft and a pair of intermediate shafts, all of the said shafts rotatably mounted in a casing in parallel relationship with each other, constant mesh change speed gear means interconnecting both of the said intermediate shafts with one of the other shafts, constant mesh forward and reverse gear means interconnecting both of the said intermediate shafts with the other of said shafts, and engageable and disengageable friction clutch means including a first pair of identical clutches associated one each with the said intermediate shafts and a second pair of identical clutches associated one each with the said intermediate shafts for selectively engaging the said forward and reverse change speed gearing for driving the said output shaft at preselected ratios and directions relative to the input shaft.

7. A power transmission including an input shaft, a reverse shaft, and idler shaft, a pair of intermediate shafts and an output shaft, all of the said shafts being rotatably mounted in a casing in parallel relationship with each other, constant mesh change speed means interconnecting both of the said intermediate shafts with the said output shaft, constant mesh forward and reverse gear means interconnecting both of the said intermediate shafts through the said reverse shaft and the said idler shaft with the said input shaft, and engageable and disengageable friction clutch means including four identical clutches associated one each with the said input and reverse shafts and one each with two of the said intermediate shafts and a second pair of identical clutches associated one each with the said intermediate shafts for selectively engaging the said forward and reverse and change of speed gearing for driving the said output shaft at preselected ratios and directions relative to the said input shaft.

8. A power transmission including an input shaft, a reverse shaft, an idler shaft, a pair of intermediate shafts and an output shaft, all of the said shafts rotatably mounted in a casing in parallel relationship with each other, constant mesh forward and reverse gear means interconnecting the said input and reverse shafts through the said idler shaft with both of the said intermediate shafts, constant mesh change speed gear means interconnecting both of the said intermediate shafts with the said input shaft, six multiple disc friction clutches located one at one end of the said input shaft, another at the same end of the said reverse shaft, and the other four respectively at the opposite ends of both of the said intermediate shafts, each of the said clutches including a plurality of friction discs carried by the respective shaft end and a surrounding drum carrying a plurality of friction discs interleaved with its respective shaft discs, and means for selectively engaging the said clutches in pairs for driving the output shaft at any of four different ratios in either direction of rotation relative to the said input shaft.

9. A vertically disposed power transmission mechanism comprising, an input shaft, a reverse shaft, an idler shaft, a pair of intermediate shafts and an output shaft, all of the said shafts rotatably mounted in a casing in parallel relationship with each other, the said input and reverse shafts being near the top of the casing, the said idler shaft below the said forward and reverse shafts, the said intermediate shafts below the said idler shaft and the said output shaft below the said intermediate shafts, constant mesh forward and reverse gear means interconnecting the said input and reverse shafts through the said idler shaft with both of the said intermediate shafts, constant mesh change speed gear means interconnecting both of the said intermediate shafts with the said output shaft, six multiple disc friction clutches located one at one end of the said input shaft, another at the same end of the said reverse shaft, and the other four respectively at the opposite ends of both of the said intermediate shafts, each of the said clutches including a plurality of friction discs carried by the respective shaft end and a surrounding drum carrying a plurality of friction discs interleaved with its respective shaft discs, and means for selectively engaging the said clutches in pairs for driving the output shaft at any of four different ratios in either direction of rotation relative to the said input shaft.

10. A vertically disposed power transmission mechanism including a casing having forward and rear spaced apart walls, an input shaft, a reverse shaft, an output shaft and a pair of intermediate shafts, all of the said shafts projecting through the said two casing walls and rotatably mounted therein in parallel relation with each other, the said forward and reverse shafts being located near the top of the said casing, the said output shaft below the said forward and reverse shafts, the said pair of intermediate shafts below the said output shaft and the said idler shaft below the said intermediate shafts, a transfer gear coaxial with and rotatable around the said output shaft, constant mesh forward and reverse gear means including the said transfer gear and gears on the said idler shaft interconnecting the said input and reverse shafts with both of the said intermediate shafts, constant mesh change speed gear means interconnecting both of the said intermediate shafts with the said output shaft, six multiple disc friction clutches located one at one end of the said input shaft, another at the same end of the said reverse shaft, and the other four respectively at the opposite ends of both of the said intermediate shafts, each of the said clutches including a plurality of friction discs carried by the respective shaft end and a surrounding drum carrying a plurality of friction discs interleaved with its respective shaft discs, and means for selectively engaging the said clutches in pairs for driving the output shaft at any of four different ratios in either direction of rotation relative to the said input shaft.

11. In a transmission, forward and rear vertically disposed walls, a plurality of rotatable shafts extending through the said walls, the said plurality of rotatable shafts including an input shaft, an output shaft and a pair of intermediate shafts, four clutches located respectively at the ends of the said intermediate shafts outside the said walls, each of the said clutches including at least one friction member mounted on the respective shaft end for rotation therewith and a rotatable drum surrounding the shaft end and arranged to be selectively clutched to its respective friction member, constant mesh gear means interconnecting the said input shaft and all four of the said rotatable drums, and additional constant mesh gear means interconnecting both of the said intermediate shafts and the said output shaft.

12. In a transmission, forward and rear vertically disposed walls having a plurality of pairs of aligned openings in the respective walls, an input shaft, an output shaft and a pair of intermediate shafts, all of the said shafts rotatably mounted in parallel relationship with each other and extending through the said walls through the said aligned pairs of openings, constant mesh forward and reverse gear means located at least partly outside the said walls interconnecting the said input shaft with both of the said intermediate shafts, constant mesh change speed gear means located in the said space between the said walls interconnecting both of the said intermediate shafts with the said output shaft, and engageable and disengageable friction clutch means located outside the said walls and interconnected with the said forward and reverse gear means outside the walls for selectively engaging the said change speed gearing for driving the said output shaft at preselected ratios relative to the said input shaft.

13. In a transmission, forward and rear vertically disposed walls having a plurality of pairs of aligned openings in the respective walls, an input shaft, an output shaft and a pair of intermediate shafts, all of the said shafts rotatably mounted in parallel relationship with each other and extending through the said walls through the said aligned pairs of openings, constant mesh forward and reverse gear means located at least partly outside the said walls interconnecting the said input shaft with both of the said intermediate shafts, constant mesh change speed gear means located in the said space between the said walls interconnecting both of the said intermediate shafts with the said output shaft, and engageable and disengageable friction clutch means located outside the said walls and interconnected with the said forward and reverse gear means outside the walls including a first pair of identical clutches associated one each with the said intermediate shafts and a second pair of identical clutches associated one each with the said intermediate shafts for selectively engaging the said change speed gearing for driving the said output shaft at preselected ratios relative to the said input shaft.

14. In a transmission, forward and rear vertically disposed walls forming a space therebetween, an input shaft extending through the side walls, a first clutch gear rotatably positioned in coaxial relation around the said input shaft outside the said rear wall, a first clutch adapted to selectively connect the rearward end of the said input shaft to the said first clutch gear, a reverse shaft extending through the said walls, a second clutch gear rotatably positioned in coaxial relation around the said reverse shaft outside the said rear wall, a second clutch adapted to selectively connect the said second clutch gear to the said reverse shaft, constant mesh gear means driving the said reverse shaft from the said input shaft, an idler shaft extending through the said two walls, a first idler gear secured to the said idler shaft outside the rear wall and in constant mesh with the said first and second clutch gears, a second idler gear located on the other end of the said idler shaft outside the front wall, a pair of intermediate shafts extending through the said two walls, four additional clutch gears positioned respectively in rotatable coaxial relation around the ends of the said two intermediate shafts outside the front and rear walls respectively, two of said additional clutch gears being in constant mesh with the said first idler gear and the other two said additional clutch gears being in constant mesh with the said second idler gear, four clutches adapted to selectively connect the four additional clutch gears to the respective ends of the intermediate shafts, an output shaft extending through the said two walls, and constantly meshing gear means connecting both of the said intermediate shafts with the said output shaft.

15. A transmission comprising forward and rear vertically disposed walls forming a space therebetween, an input shaft extending through the said walls near the top thereof and projecting beyond the walls at both ends, a first clutch gear rotatably positioned in coaxial relation around the said input shaft outside the said rear wall, a first clutch adapted selectively to connect the rearward end of the said input shaft to the said first clutch gear, a reverse shaft positioned laterally of the said input shaft and extending through the said walls and projecting beyond the rear wall, a second clutch gear rotatably positioned in coaxial relation around the said reverse shaft outside the said rear wall, a second clutch adapted to selectively connect the said second clutch gear to the said reverse shaft, a first pair of gears in constantly meshed relation one each on the said forward and reverse shafts in the said space whereby the said reverse shaft is driven from the said input shaft, an idler shaft extending through the said two walls at a level below the said input and reverse shafts and projecting beyond both walls, a first idler gear secured to the said idler shaft outside the rear wall and in constant mesh with the said first and second clutch gears, a second idler gear located on the other end of the said idler shaft outside the said front wall, a pair of intermediate shafts extending through the said two walls at a level below the said idler shaft and projecting beyond both walls, four additional clutch gears positioned respectively in coaxial relation around the ends of the said two intermediate shafts outside the front and rear walls respectively, two of the said additional clutch gears being in constant mesh with the said first idler gear and the other two said additional clutch gears being in constant mesh with the said second idler gear, four clutches adapted selectively to connect the said four additional clutch gears to the respective ends of the intermediate shafts, an output shaft extending through the said two walls at a level below the said two intermediate shafts, a second pair of gears in constantly meshed relation one each on one of the said intermediate shafts and the said output shaft, and a third pair of said gears in constantly meshed relation one each on the other said intermediate shaft and on the said output shaft.

16. A transmission comprising forward and rear vertically disposed walls forming a space therebetween, an input shaft extending through the said walls near the top thereof and projecting beyond the walls at both ends, a first clutch gear rotatably positioned in coaxial relation around the said input shaft outside the said rear wall, a first clutch adapted selectively to connect the rearward end of the said input shaft to the said first clutch gear, a reverse shaft positioned parallel to the said input shaft and extending through the said walls and projecting beyond the rear wall, a second clutch gear rotatably positioned in coaxial relation around the said reverse shaft outside the said rear wall, a second clutch adapted to selectively connect the said second clutch gear to the said reverse shaft, a first pair of gears in constantly meshed relation one each on the said forward and reverse shafts in the said space whereby the said reverse shaft is driven from the said input shaft, an output shaft extending through the said two walls at a level below the said input and reverse shafts and projecting beyond both walls, a transfer gear coaxial with the said output shaft and rotatable with respect thereto located outside the said rear wall, a pair of intermediate shafts extending through the said two walls at a level below the said output shaft and projecting beyond both walls, four additional clutch gears positioned respectively in coaxial relation around the ends of the said two intermediate shafts outside the said front and rear walls respectively, one of the two said additional clutch gears outside the said rear wall being in constant mesh with the said transfer gear, four clutches adapted selectively to connect the said four additional clutch gears to the respective ends of the intermediate shafts, an idler shaft extending through the said two walls at a level below the said two intermediate shafts and projecting beyond both walls, a first idler gear secured to the said idler shaft outside the rear wall and in constant mesh with the said two additional clutch gears, a second idler gear located on the other end of the said idler shaft outside the said front wall and in constant mesh with the other two said additional clutch gears, a second pair of gears in constantly meshed relation one each on one of the said intermediate shafts and the said output shaft, and a third pair of gears in constantly meshed relation one each on the other said intermediate shaft and on the said output shaft.

17. In a transmission, forward and rear vertically disposed walls forming a space therebetween, an input shaft extending through the said walls, a first clutch gear rotatably positioned in coaxial relation around the said input shaft outside the said rear wall, a first clutch adapted to selectively connect the rearward end of the said input shaft to the said first clutch gear, an additional shaft extending through the said walls, a second clutch gear rotatably positioned in coaxial relation around the said additional shaft outside the said rear wall, a second clutch adapted to selectively connect the said second clutch gear to the said additional shaft, constant mesh gear means driving the said additional shaft from the said input shaft in the same direction, an idler shaft extending through the said two walls, a first idler gear secured to the said idler shaft outside the rear wall and in constant mesh with the said first and second clutch gears, a second idler gear located on the other end of the said idler shaft outside the front wall, a pair of intermediate shafts extending through the said two walls, four additional clutch gears positioned respectively in rotatable coaxial relation around the ends of the said two intermediate shafts outside the front and rear walls respectively, two of the said additional clutch gears being in constant mesh with the said first idler gear, a third one of the said additional clutch gears being in constant mesh with the said second idler gear, the fourth additional clutch gears being in constant mesh with a third idler gear which is in constant mesh with the said second idler gear, four clutches adapted to selectively connect the said four additional clutch gears to the respective ends of the intermediate shafts, an output shaft extending through the said two walls, constant mesh gear means connecting both of the said intermediate shafts with the said output shaft, and means for selectively engaging the said clutches in pairs for driving the said output shaft at six different ratios in one direction and two different ratios in the other direction.

18. In a transmission, forward and rear vertically disposed walls forming a space therebetween, an input shaft extending through the said walls, a first clutch gear rotatably positioned in coaxial relation around the said input shaft outside the said rear wall, a first clutch adapted to selectively connect the rearward end of the said input shaft to the said first clutch gear, a reverse shaft extending through the said walls, a second clutch gear rotatably positioned in coaxial relation around the said reverse shaft outside the said rear wall, a second clutch adapted to selectively connect the said second clutch gear to the said reverse shaft, constant mesh gear means driving the said reverse shaft from the said input shaft, an idler shaft extending through the said two walls, a first idler gear secured to the said idler shaft outside the rear wall and in constant mesh with the said first and second clutch gears, a second idler gear located on the other end of the said idler shaft outside the front wall, a pair of intermediate shafts extending through the said two walls, four additional clutch gears positioned respectively in rotatable coaxial relation around the ends of the said two intermediate shafts outside the front and rear walls respectively, two of said additional clutch gears being in constant mesh with the said first idler and the other two said additional clutch gears being in constant mesh with the said second idler gear, four clutches adapted to selectively connect the four additional clutch gears to the respective ends of the intermediate shafts, an output shaft extending through the said two walls, constantly meshing gear means connecting both of the said intermediate shafts with the said output shaft, an additional shaft associated with the said output shaft, and a planetary gear mechanism for driving the said additional shaft from the said output shaft directly or through a gear reduction.

19. A transmission comprising a plurality of rotatable shafts arranged in parallel relation including a first shaft, a pair of intermediate shafts and an output shaft, means for rotating the said first shaft, two gears mounted on the said first shaft for rotation therewith, four clutches associated two each with the said intermediate shafts, each of the said clutches including a clutch drum member, four drum gears mounted respectively on the said clutch drum members for conjoint rotation therewith, the two drum gears associated with each intermediate shaft being in mesh respectively with the two gears on the said first shaft, means for applying the said four clutches selectively whereby either intermediate shaft may be operated from the said first shaft through either of the gears thereon, and means for operating the said output shaft from either of the said intermediate shafts.

20. In a transmission, forward and rear vertically disposed walls, a plurality of rotatable shafts extending through the said walls, the said plurality of rotatable shafts including an input shaft, an idler shaft, a pair of intermediate shafts and an output shaft, means interconnecting the said input and idler shafts for driving the latter from the former, two gears mounted on the said idler shaft outside the said walls for rotation therewith, four clutches located respectively at the ends of the said intermediate shafts outside the said walls, each of the said clutches including a rotatable drum member surrounding the shaft and rotatable relative thereto and friction means for selectively clutching the drum member to the shaft, four drum gears carried respectively by the said clutch drums, the two drum gears for each intermediate shaft in mesh respectively with the two gears on the said idler shaft, and additional constant mesh gear means interconnecting both of the said intermediate shafts with the said output shaft.

References Cited in the file of this patent

UNITED STATES PATENTS

Re. 24,327    Lee _____ June 11, 1957

UNITED STATES PATENT OFFICE
CERTIFICATE OF CORRECTION

Patent No. 3,126,752                        March 31, 1964

Ronald H. Bolster

It is hereby certified that error appears in the above numbered patent requiring correction and that the said Letters Patent should read as corrected below.

Column 1, line 65, after "last" insert -- one --; line 72 for "produces" read -- provides --; column 10, line 64, after "of" insert -- the --; column 11, line 54, for "out put" read -- output --; column 12, line 26, for "and" read -- an --; column 14, line 27, for "side" read -- said --; column 16, line 55, after "idler" insert -- gear --.

Signed and sealed this 8th day of September 1964.

(SEAL)
Attest:

ERNEST W. SWIDER
Attesting Officer

EDWARD J. BRENNER
Commissioner of Patents